United States Patent
Chiu et al.

(10) Patent No.: US 12,237,977 B2
(45) Date of Patent: Feb. 25, 2025

(54) METHOD FOR RESUMING TOPOLOGY OF SINGLE LOOP NETWORK AND SWITCH NETWORK SYSTEM

(71) Applicant: REALTEK SEMICONDUCTOR CORP., Hsinchu (TW)

(72) Inventors: Chih-Ming Chiu, Hsinchu (TW); Kai-Wen Cheng, Hsinchu (TW); Yu-Yi Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 204 days.

(21) Appl. No.: 18/092,788

(22) Filed: Jan. 3, 2023

(65) Prior Publication Data
US 2023/0412463 A1     Dec. 21, 2023

(30) Foreign Application Priority Data
Jun. 15, 2022  (TW) .................. 111122299

(51) Int. Cl.
*H04L 41/12*     (2022.01)
*H04L 41/34*     (2022.01)
*H04L 41/40*     (2022.01)

(52) U.S. Cl.
CPC .............. *H04L 41/12* (2013.01); *H04L 41/34* (2022.05); *H04L 41/40* (2022.05)

(58) Field of Classification Search
CPC ....... H04L 41/12; H04L 41/122; H04L 41/34; H04L 41/342; H04L 41/344; H04L 41/40
See application file for complete search history.

(56) References Cited

U.S. PATENT DOCUMENTS

| | | | |
|---|---|---|---|
| 2003/0214962 A1 | 11/2003 | Allaye-Chan et al. | |
| 2004/0081083 A1* | 4/2004 | Sekihata | H04L 12/42 370/252 |

(Continued)

FOREIGN PATENT DOCUMENTS

| | | |
|---|---|---|
| CN | 101771580 A | 7/2010 |
| CN | 101924663 A | 12/2010 |

(Continued)

OTHER PUBLICATIONS

Shah et al., "Ethernet Automatic Protection Switching (EAPS), Version 1; draft-shah-extreme-eaps-00.txt", Internet Engineering Task Force, IETF; Standardworkingdraft, Internet Society (ISOC) 4, Dec. 11, 2002, XP015035157, 7 pages total.

*Primary Examiner* — Rachel J Hackenberg
(74) *Attorney, Agent, or Firm* — Birch, Stewart, Kolasch & Birch, LLP (57) ABSTRACT

A method for resuming topology of a single loop network and a network switch system are provided. The network switch system includes one or more first network switches each having a first port and a second port and a second network switch having a third port and a fourth port. When the first port of one of the first network switches is abnormal, a recovery control frame is transmitted through the second port. The second network switch sets the third port in a disabled state to an enabled state. When the abnormal port is resumed, the first network switch transmits a block control frame through the second port. The second network switch sets the third port in the enabled state to the disabled state and transmits a forward control frame through the fourth port. The first network switch sets the first port in the disabled state to the enabled state.

16 Claims, 10 Drawing Sheets

(56) References Cited

U.S. PATENT DOCUMENTS

| | | | |
|---|---|---|---|
| 2005/0207348 A1 | 9/2005 | Tsurumi et al. | |
| 2007/0253330 A1* | 11/2007 | Tochio | H04L 12/423 370/222 |
| 2013/0064069 A1* | 3/2013 | Huang | H04L 12/437 370/222 |
| 2018/0212828 A1* | 7/2018 | Sekhri | H04L 12/4641 |

FOREIGN PATENT DOCUMENTS

| | | |
|---|---|---|
| CN | 101997735 A | 3/2011 |
| CN | 111130943 A | 5/2020 |
| TW | 202207669 A | 2/2022 |

* cited by examiner

METHOD FOR RESUMING TOPOLOGY OF SINGLE LOOP NETWORK AND SWITCH NETWORK SYSTEM

CROSS-REFERENCE TO RELATED APPLICATION

This non-provisional application claims priority under 35 U.S.C. § 119(a) to Patent Application No. 111122299 filed in Taiwan, R.O.C. on Jun. 15, 2022, the entire contents of which are hereby incorporated by reference.

BACKGROUND

Technical Field

The instant disclosure is related to network topology technology, especially a method for resuming the topology of a single loop network and a network switch system.

Related Art

In network technologies, the spanning tree protocol (STP) technology is an important technology of the network switch. The goal of the STP technology is to avoid various problems caused by network loops. However, it takes 30 seconds to complete the establishment of the STP technology known to the inventor, and data transmission can only begin upon completion of establishment. When a topology change occurs to the network, the STP technology known to the inventor takes another 30 seconds to resume to a steady state, and thus the time for establishment is quite long. As a result, the STP technology was improved, and the rapid spanning tree protocol (RSTP) technology was proposed. However, the RSTP technology still takes 2-3 seconds to complete/recomplete the establishment of network topology. For the amount of transmitted data in modem networks, the RSTP technology can still cause a great amount of data loss.

SUMMARY

An embodiment of the instant disclosure provides a method for resuming the topology of a single loop network. The single loop network comprises at least one first network switch and a second network switch. Each of the at least one first network switch comprises a first port and a second port, and the second network switch comprises a third port and a fourth port. Each of the first port, the second port, the third port, and the fourth port is in an enabled state or a disabled state by default so as to form a single loop network.

The method for resuming the topology of the single loop network comprises: in response to that one of the at least one first network switch detects that the first port is abnormal, setting the first port to the disabled state by the first network switch and transmitting a recovery control frame through the second port by the first network switch; in response to that the second network switch receives the recovery control frame, setting the third port in the disabled state to the enabled state by the second network switch; in response to that the first network switch detects that the first port is resumed, transmitting a block control frame through the second port by the first network switch; in response to that the second network switch receives the block control frame, setting the third port in the enabled state to the disabled state by the second network switch and transmitting a forward control frame through the fourth port by the second network switch; and in response to that the first network switch receives the forward control frame, setting the first port in the disabled state to the enabled state by the first network switch.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
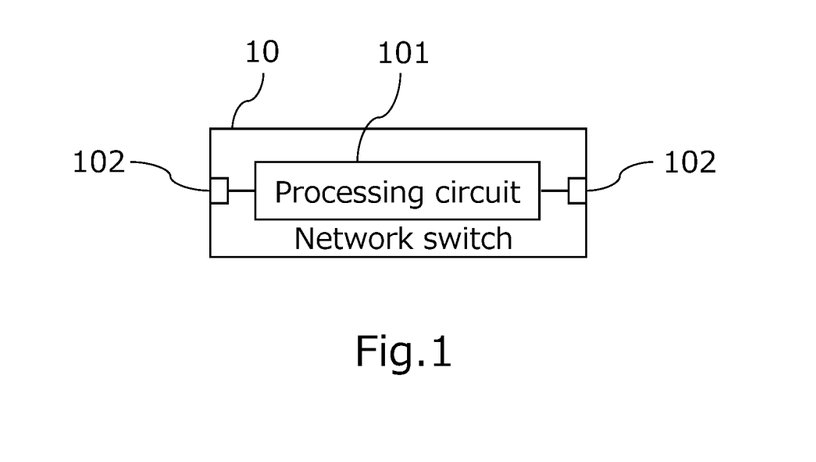
FIG. 1 illustrates a schematic block diagram of a network switch according to an exemplary embodiment of the instant disclosure.

FIG. 1 illustrates a schematic block diagram of a network switch according to an exemplary embodiment of the instant disclosure. Please refer to FIG. 1. The network switch 10 comprises a processing circuit 101 and a plurality of ports 102. In FIG. 1, the network switch 10 having two ports 102 is shown as an example, but the instant disclosure is not limited thereto; the number of the ports 102 may be greater than two.

Each of the ports 102 can be in an enabled state or a disabled state by default. The processing circuit 101 is coupled to the ports 102 so as to set each of the ports 102 to the enabled state or the disabled state. When the network switch 10 is on a path of a single loop network, if one of the port 102 is in the enabled state, the port 102 can receive data frames transmitted by a previous network switch of the single loop network and can forward data frames received by another one of the ports 102 to a next network switch of the single loop network. In other words, in this embodiment, a port 102 in the enabled state can receive data frames and forward data frames. If one of the ports 102 is in the disabled state, the port 102 can receive data frames transmitted by the previous network switch and does not forward data frames received by another one of ports 102 to the next network switch. In other words, in this embodiment, a port 102 in the disabled state can receive data frames and does not forward data frames. For example, a port 102 can be connected to electronic devices such as cameras and computers. Take cameras as an example, the aforementioned data frames may be image data.

Based on this, through setting each of the ports 102 to the enabled state or the disabled state by the processing circuit 101, the ports 102 of the network switch 10 can be connected to the ports of other similar network switches through transmission cables, and the other network switches can also set each of the corresponding ports to the enabled state or the disabled state, so that a single loop network between the network switch 10 and other network switches can be formed, and the network topology loop can be avoided.

Figure 2:
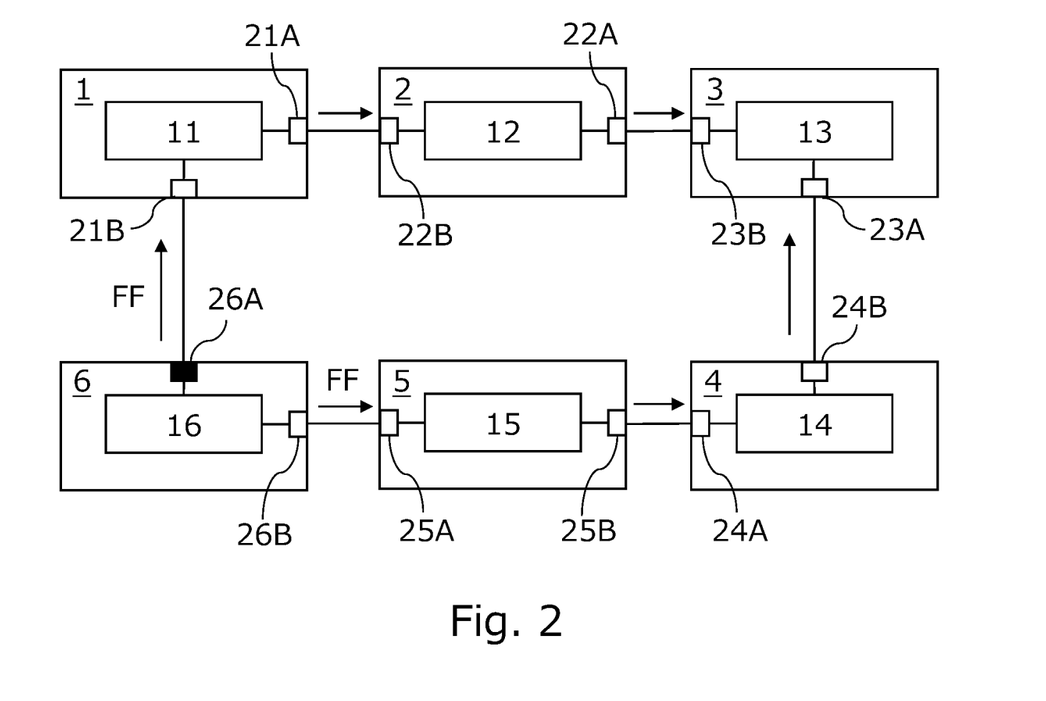
FIG. 2 illustrates a schematic block diagram of a single loop network according to an exemplary embodiment of the instant disclosure.

Please refer to FIG. 2. FIG. 2 illustrates a schematic block diagram of a single loop network according to an exemplary embodiment of the instant disclosure. In this exemplary embodiment, six of the aforementioned network switches 10 (the network switches 1-6) are taken as an example, and FIG. 2 just shows ports 21A-26A, 21B-26B used to form the single loop network and does not show other ports of the network switches 1-6. The processing circuits 11-16 of the network switches 1-6 set each of the corresponding ports 21A-26A, 21B-26B to the enabled state or the disabled state by default so as to form the single loop network. For example, the processing circuit 16 of the network switch 6 sets the port 26A to the disabled state and sets the port 26B to the enabled state; the processing circuits 11-15 of the network switches 1-6 set all corresponding ports 21A-25A, 21B-25B to the enabled state. In the figures provided in the instant disclosure, black blocks represent the ports 102 in the disabled state, and blocks not filled in with color represent the ports 102 in the enabled state. After the single loop network is built, the network switches 1-6 can transmit data frames to each other, and any of the network switches 1-6 will not receive data frames originally transmitted by itself. For example, data frames originally transmitted by the network switch 1 will not be transmitted back to the network switch 1 through the network switch 6.

Besides transmitting data frames, the network switch 10 with both ports 102 in the enabled state can also forward control frames. In other words, in this embodiment, when the network switch 10 with both ports 102 in the enabled state receives a control frame through one of the ports 102, the received control frame is forwarded in the single loop network through the other one of the ports 102, which was not used to receive the control frame. The aforementioned control frame may be a forward control frame FF, a recovery control frame RF, or a block control frame BF. These control frames are used for the rebuild and the resuming of the network topology of the single loop network (will be illustrated later). Although the ports 102 in the disabled state do not forward the control frames (i.e., in this embodiment, the control frames received by another port 102 will not be transmitted through a port 102 in the disabled state), the ports 102 in the disabled state can still receive the control frames and can actively transmit control frames.

Figure 3:
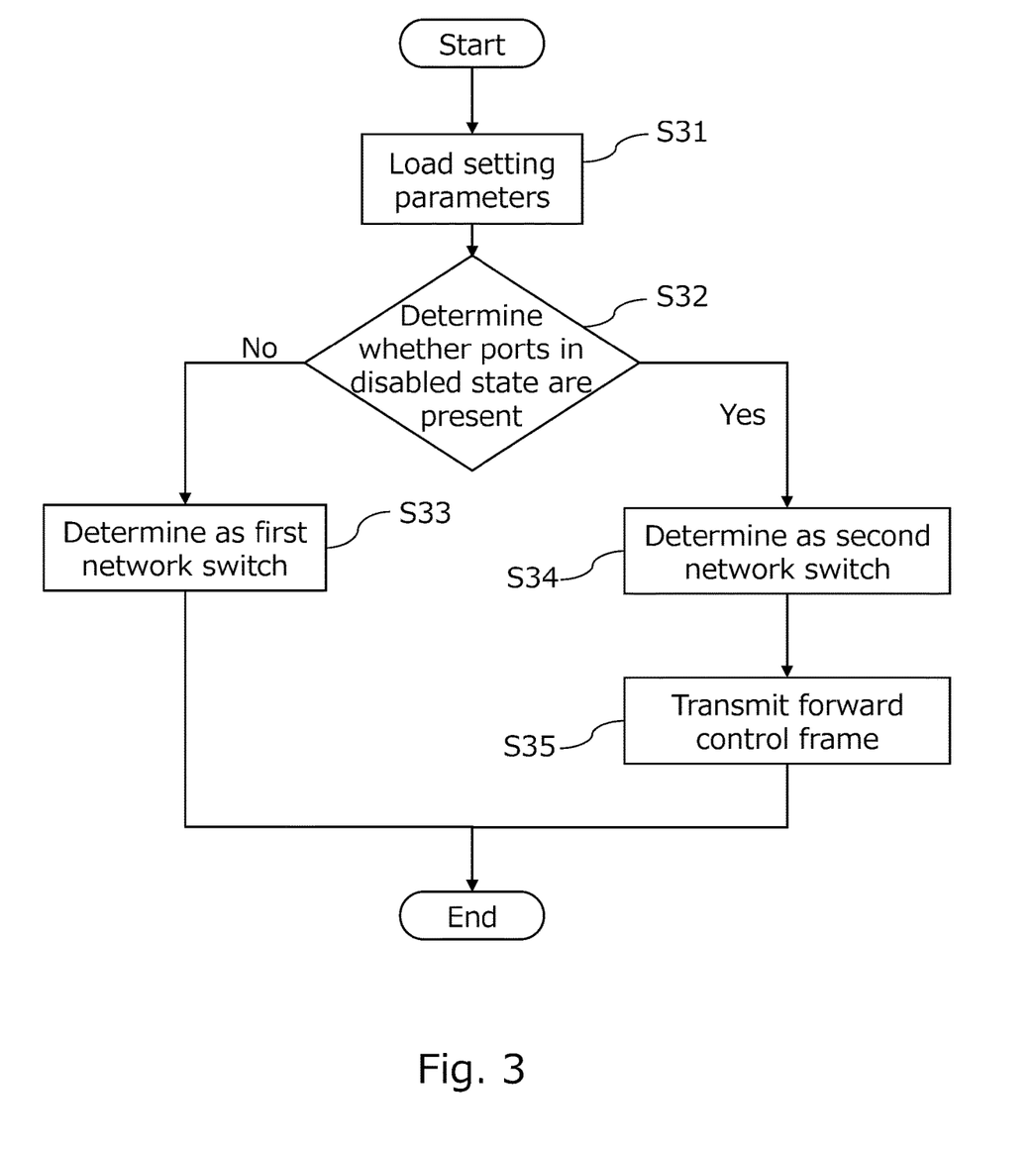
FIG. 3 illustrates a schematic flow chart of an initialization procedure of a network switch according to an exemplary embodiment of the instant disclosure.

Please refer to FIG. 3. FIG. 3 illustrates a schematic flow chart of an initialization procedure of the network switch 10 according to an exemplary embodiment of the instant disclosure. First, in the step S31, the processing circuit 101 loads setting parameters. The setting parameters may be stored in a parameter file and are used to set each of the ports 102 to the enabled state or the disabled state by default. In some exemplary embodiments, the processing circuit 101 has a storage device so as to store the parameter file. In some exemplary embodiments, the processing circuit 101 is coupled to an external storage device so as to read the parameter file stored in the external storage device. After the step S31, the step S32 is executed, where the processing circuit 101 determines whether ports 102 in the disabled state are present. If the determination comes out negative, the processing circuit 101 determines that the network switch 10 is a first type network switch (referred to as a first network switch hereinafter); that is, the step S33 is executed. On the other hand, if the determination comes out positive, the processing circuit 101 determines that the network switch 10 is a second type network switch (referred to as a second network switch hereinafter); that is, the step S34 is executed. If the network switch 10 is determined to be a second network switch, the processing circuit 10 transmits a forward control frame FF through each of the two ports 102; that is, the step S35 is executed. The effect of transmitting the control frames FF will be illustrated later. As shown in FIG. 2, the network switches 1-5 with all ports 21A-25A, 21B-25B in the enabled state are first network switches, and the network switch 6 with one port 26A in the disabled state and one port 26B in the enabled state is a second network switch.

Figure 4:
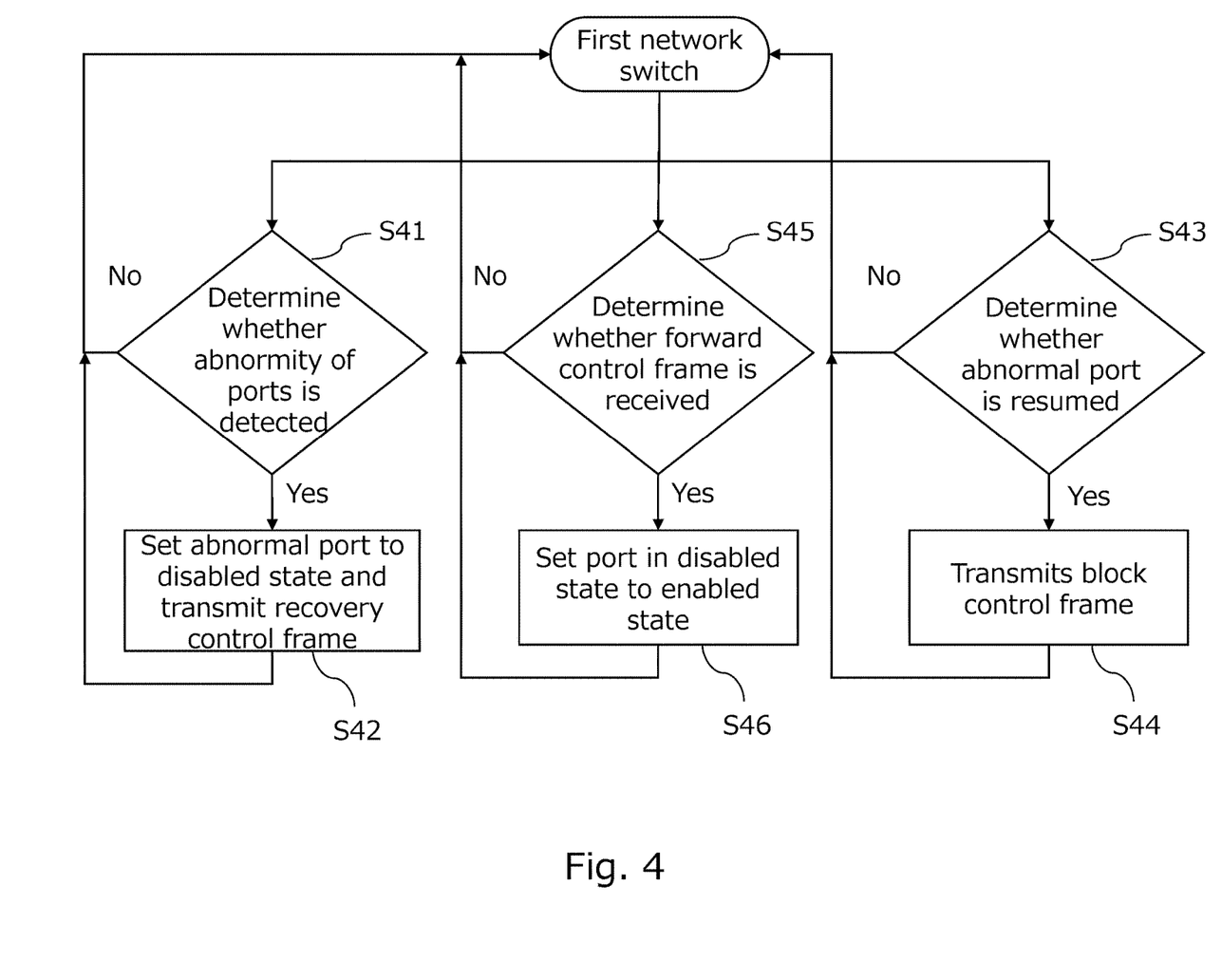
FIG. 4 illustrates a schematic flow chart of an execution procedure of a processing circuit of a first network switch according to an exemplary embodiment of the instant disclosure.
Figure 5:
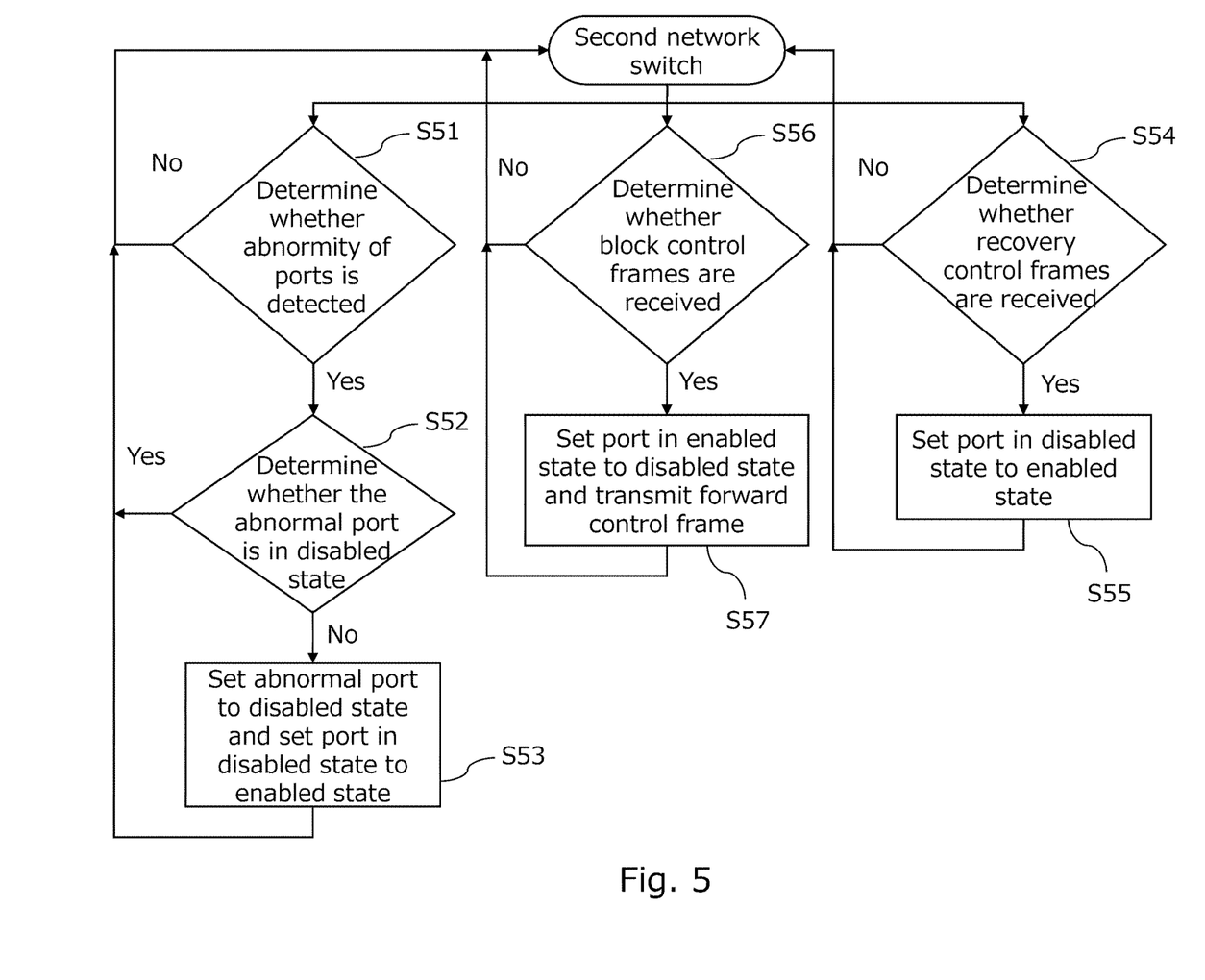
FIG. 5 illustrates a schematic flow chart of an execution procedure of a processing circuit of a second network switch according to an exemplary embodiment of the instant disclosure.
Figure 6:
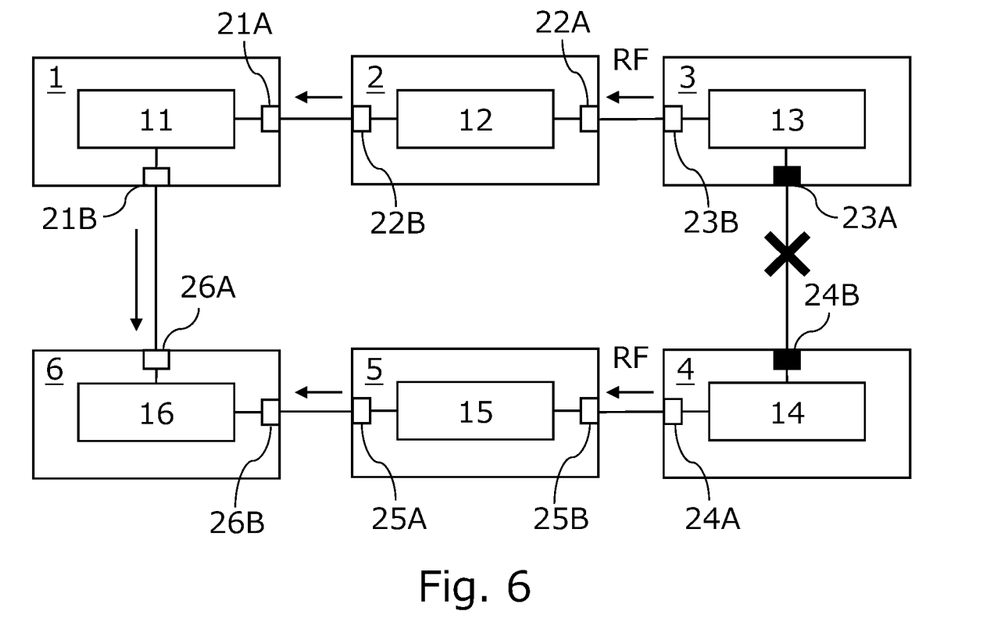
FIG. 6 illustrates a schematic diagram of topology rebuild of an abnormal single loop network according to a first exemplary embodiment of the instant disclosure.

FIG. 4 and FIG. 5 illustrate schematic flow charts of execution procedures of the processing circuits 10 of the first network switch and the second network switch according to an exemplary embodiment of the instant disclosure, respectively. FIG. 6 illustrates a schematic diagram of topology rebuild of an abnormal single loop network according to a first exemplary embodiment of the instant disclosure. FIG. 6 shows a situation where the transmission between the ports 102 of two of the first network switches is abnormal; in this embodiment, the abnormal transmission is between the port 23A of the network switch 3 and the port 24B of the network switch 4. For example, the transmission abnormity may be that the port 23A or the port 24B is damaged, that the transmission cable between the port 23A and the port 24B is damaged, or that the transmission cable is disconnected from the port 23A or the port 24B.

Please refer to FIG. 4 and FIG. 6 together. In the step S41, the processing circuit 13 of the network switch 3 determines whether the port 23A or the port 23B is detected to be abnormal. In response to that the port 23A is detected to be abnormal, the step S42 is executed, where the processing circuit 13 of the network switch 3 sets the abnormal port 23A to the disabled state and transmits a recovery control frame RF through the other port 23B. Similarly, because the processing circuit 14 of the network switch 4 also detects that the port 24B is abnormal, the processing circuit 14 of the network switch 4 sets the abnormal port 24B to the disabled state and transmits another recovery control frame RF through the other port 24A. The recovery control frame RF transmitted through the port 23B is transmitted to the network switch 6 through the network switches 2, 1; the recovery control frame RF transmitted through the port 24A is transmitted to the network switch 6 through the network switch 5.

Please refer to FIG. 5 and FIG. 6 together. In the step S54, the processing circuit 16 of the network switch 6 determines whether the recovery control frames RF are received. In response to that the recovery control frames RF are received (which means that some of the ports 102 are abnormal), the step S55 is executed, where the processing circuit 16 of the network switch 6 sets the port 26A in the disabled state to the enabled state. Here, in this embodiment, the port 26A, which was previously in the disabled state, serves as a backup port, and through switching the backup port to the enabled state, the single loop network is rebuilt and can resume normal operation.

Figure 7:
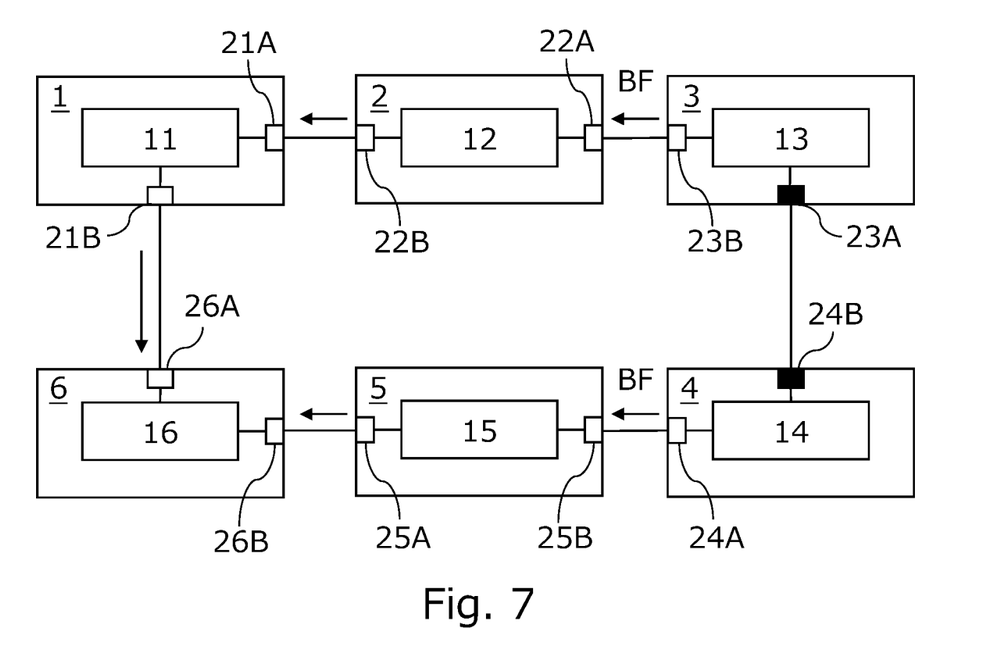
FIG. 7 illustrates a first schematic diagram of topology resuming of an abnormal single loop network according to the first exemplary embodiment of the instant disclosure.

FIG. 7 illustrates a first schematic diagram of topology resuming of an abnormal single loop network according to the first exemplary embodiment of the instant disclosure. Please refer to FIG. 4 and FIG. 7 together. In the step S43, the processing circuit 13 of the network switch 3 determines whether the abnormal port A23 is resumed. After restoring operations such as repairing, in response to that the processing circuit 13 of the network switch 3 detects that the port 23A is resumed, the step S44 is executed, where the processing circuit 13 of the network switch 3 transmits a block control frame BF through the port 23B. Similarly, in response to that the processing circuit 14 of the network switch 4 detects that the port 24B is resumed, the processing circuit 14 of the network switch 4 transmits another block control frame BF through the port 24A. The block control frame BF transmitted through the port 23B is transmitted to the network switch 6 through the network switches 2, 1; the block control frame BF transmitted through the port 24A is transmitted to the network switch 6 through the network switch 5.

Figure 8:
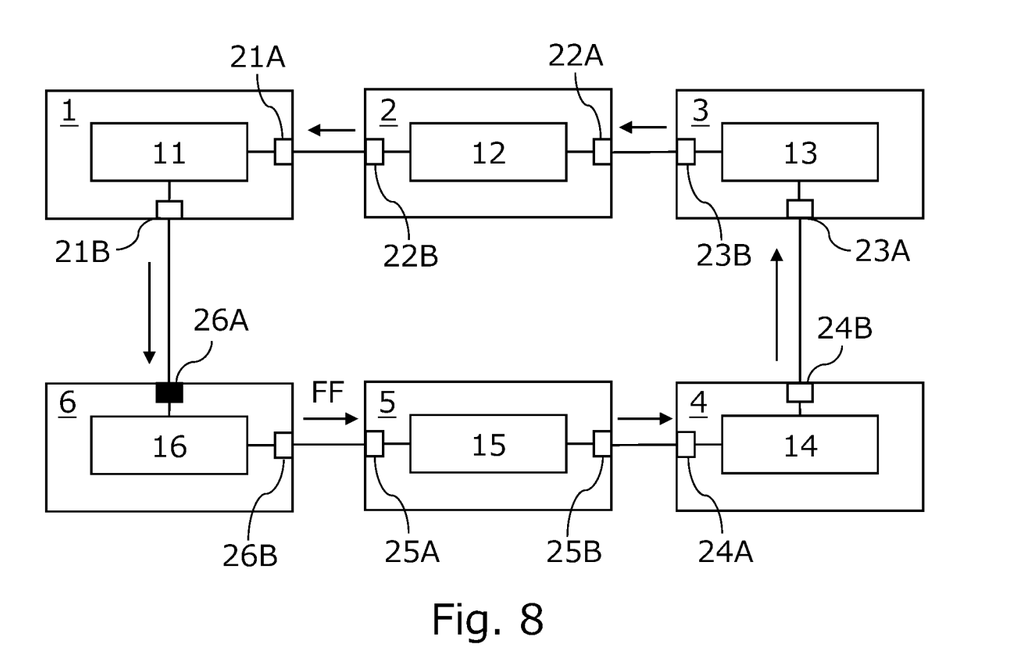
FIG. 8 illustrates a second schematic diagram of topology resuming of an abnormal single loop network according to the first exemplary embodiment of the instant disclosure.

FIG. 8 illustrates a second schematic diagram of topology resuming of an abnormal single loop network according to the first exemplary embodiment of the instant disclosure. Please refer to FIG. 5 and FIG. 8 together. In the step S56, the processing circuit 16 of the network switch 6 determines whether the block control frames BF are received. In response to that the block control frames BF are received (which means that the abnormal ports 102 are resumed), the step S57 is executed, where the processing circuit 16 of the network switch 6 sets the port 26A in the enabled state to the disabled state and transmits a forward control frame FF through the port 26B. The forward control frame FF is sequentially forwarded by the following network switches 5, 4, 3, 2, 1.

Please refer to FIG. 4 and FIG. 8 together. In the step S45, the processing circuit 14 of the network switch 4 determines whether the forward control frame FF is received. In response to that the forward control frame FF is received (which means that the backup port of the second network switch has been switched back to the disabled state), the step S46 is executed, where the processing circuit 14 of the network switch 4 sets the port 24B in the disabled state to the enabled state. Similarly, in response to that the processing circuit 13 of the network switch 3 receives the forward control frame FF, the processing circuit 13 of the network switch 3 sets the port 23A in the disabled state to the enabled state. As a result, the network topology of the single loop network is resumed to the state before abnormity occurred.

Figure 9:
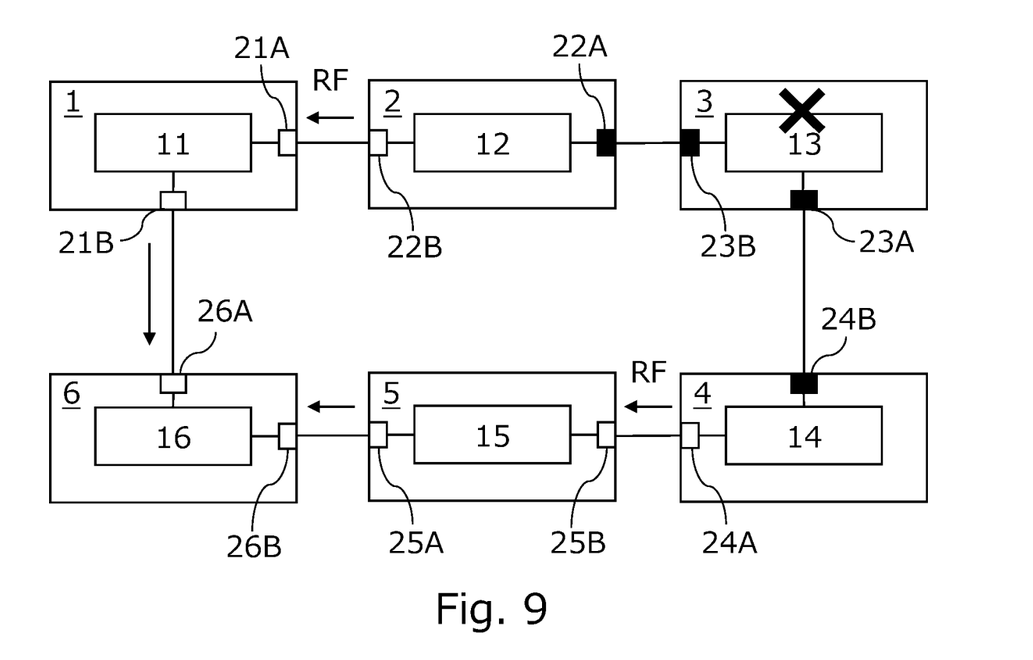
FIG. 9 illustrates a schematic diagram of topology rebuild of an abnormal single loop network according to a second exemplary embodiment of the instant disclosure.

FIG. 9 illustrates a schematic diagram of topology rebuild of an abnormal single loop network according to a second exemplary embodiment of the instant disclosure. FIG. 9 shows a situation where one of the first network switches is abnormal, such as, but not limited to, when a blackout, a crash, or damage occurs to the network switch. In this example, the network switch 3 is abnormal. Please refer to FIG. 4 and FIG. 9 together. Similar to the first exemplary embodiment illustrated above, through the step S41 and the step S42, the processing circuit 12 of the network switch 2 and the processing circuit 14 of the network switch 4 respectively detect that the ports 22A, 24B are abnormal and thus respectively set the abnormal ports 22A, 24B to the disabled state and transmit recovery control frames RF through the ports 22B, 24A.

Next, similar to the first exemplary embodiment illustrated above, as shown in FIG. 5 and FIG. 9, through the step S54 and the step S55, in response to that the processing circuit 16 of the network switch 6 receives the recovery control frames RF, the processing circuit 16 of the network switch 6 sets the port 26A in the disabled state to the enabled state. As a result, the single loop network is rebuilt and can resume normal operation.

Figure 10:
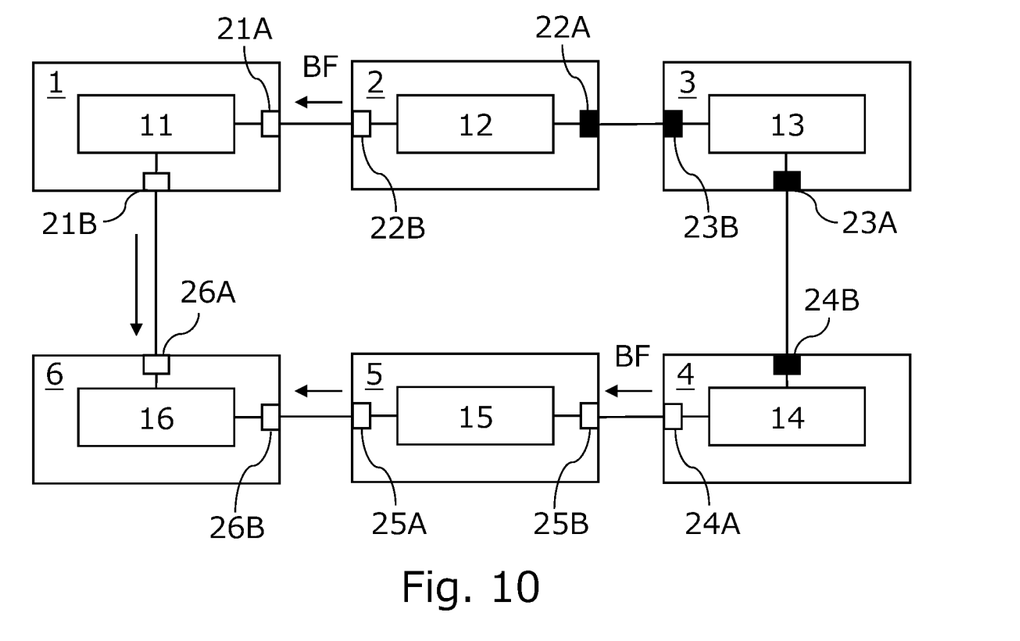
FIG. 10 illustrates a first schematic diagram of topology resuming of an abnormal single loop network according to the second exemplary embodiment of the instant disclosure.

FIG. 10 illustrates a first schematic diagram of topology resuming of an abnormal single loop network according to the second exemplary embodiment of the instant disclosure. Please refer to FIG. 4 and FIG. 10 together. In the step S43, the processing circuit 12 of the network switch 2 determines whether the abnormal port 22A is resumed, and the processing circuit 14 of the network switch 4 determines whether the abnormal port 24B is resumed. After restoring operations such as electricity restoration, rebooting, or repairing, in response to that the processing circuit 12 of the network switch 2 detects that the port 22A is resumed, the step S44 is executed, where the processing circuit 12 of the network switch 2 transmits a block control frame BF through the port 22B. Similarly, in response to that the processing circuit 14 of the network switch 4 detects that the port 24B is resumed, the processing circuit 14 of the network switch 4 transmits another block control frame BF through the port 24A.

Figure 11:
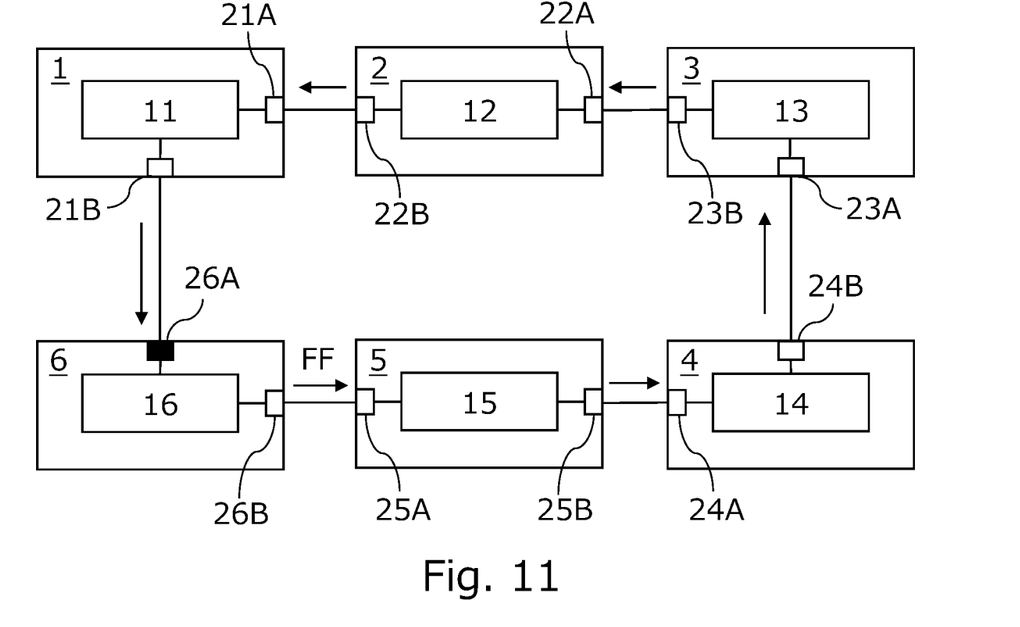
FIG. 11 illustrates a second schematic diagram of topology resuming of an abnormal single loop network according to the second exemplary embodiment of the instant disclosure.

FIG. 11 illustrates a second schematic diagram of topology resuming of an abnormal single loop network according to the second exemplary embodiment of the instant disclosure. Please refer to FIG. 5 and FIG. 11 together. Similar to the first exemplary embodiment illustrated above, through the step S56 and the step S57, in response to that the processing circuit 16 of the network switch 6 receives the block control frames BF, the processing circuit 16 of the network switch 6 sets the port 26A in the enabled state to the disabled state and transmits a forward control frame FF through the port 26B.

Please refer to FIG. 4 and FIG. 11 together. In the step S45, the processing circuit 12 of the network switch 2 determines whether the forward control frame FF is received. In response to that the forward control frame FF is received, the step S46 is executed, where the processing circuit 14 of the network switch 4 sets the port 24B in the disabled state to the enabled state. Similarly, in response to that the processing circuit 12 of the network switch 2 receives the forward control frame FF, the processing circuit 12 of the network switch 2 sets the port 22A in the disabled state to the enabled state. As a result, the network topology of the single loop network is resumed to the state before abnormity occurred.

Figure 12:
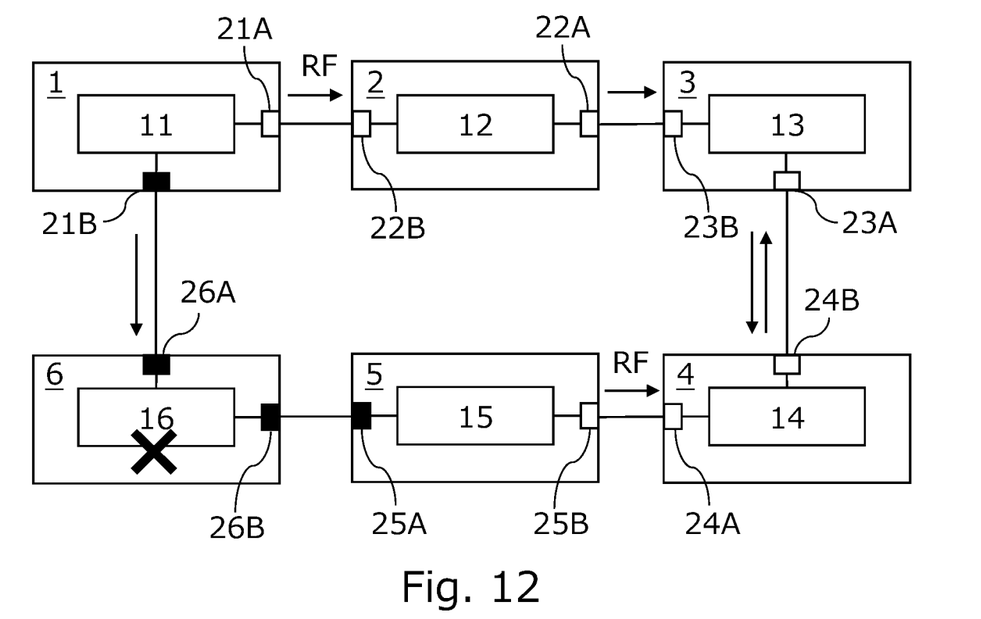
FIG. 12 illustrates a schematic diagram of topology rebuild of an abnormal single loop network according to a third exemplary embodiment of the instant disclosure.

FIG. 12 illustrates a schematic diagram of topology rebuild of an abnormal single loop network according to a third exemplary embodiment of the instant disclosure. FIG. 12 shows a situation where the second network switch (i.e., the network switch 6 in this exemplary embodiment) is abnormal, such as, but not limited to, when a blackout, a crash, or damage occurs to the network switch. Please refer to FIG. 4 and FIG. 12 together. Similar to the first and second exemplary embodiments illustrated above, through the step S41 and the step S42, the processing circuit 11 of the network switch 1 and the processing circuit 15 of the network switch 5 respectively detect that the ports 21B, 25A are abnormal and thus respectively set the abnormal ports 21B, 25A to the disabled state and transmit recovery control frames RF through the ports 21A, 25B.

Next, similar to the first and second exemplary embodiments illustrated above, as shown in FIG. 5 and FIG. 12 together, through the step S54 and the step S55, in response to that the processing circuit 16 of the network switch 6 receives the recovery control frames RF, the processing circuit 16 of the network switch 6 sets the port 26A in the disabled state to the enabled state. As a result, the single loop network is rebuilt and can resume normal operation.

Figure 13:
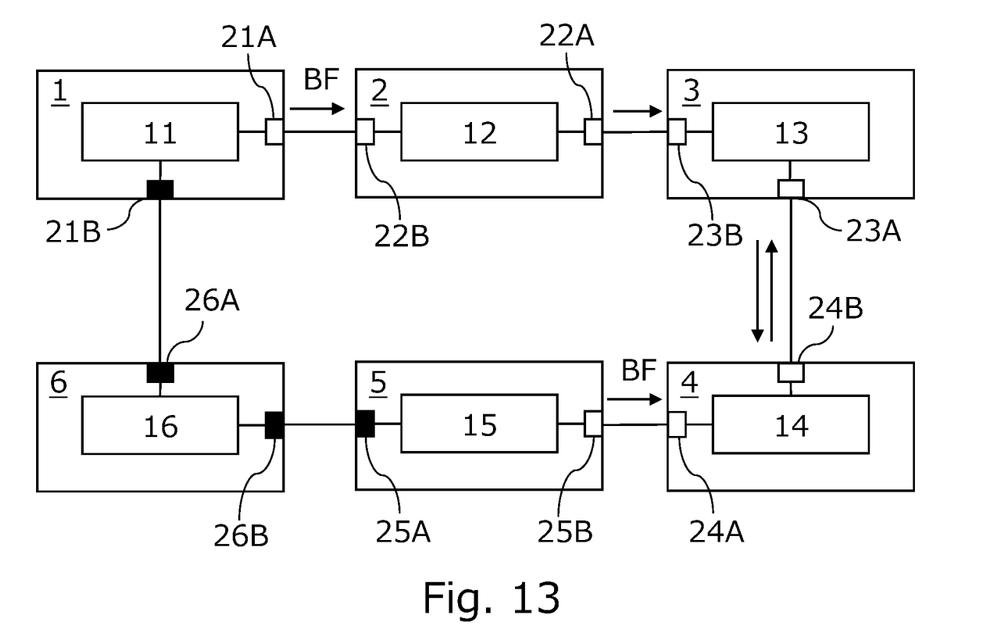
FIG. 13 illustrates a first schematic diagram of topology resuming of an abnormal single loop network according to the third exemplary embodiment of the instant disclosure.

FIG. 13 illustrates a first schematic diagram of topology resuming of an abnormal single loop network according to the third exemplary embodiment of the instant disclosure. Please refer to FIG. 4 and FIG. 13 together. In the step S43, the processing circuit 11 of the network switch 1 determines whether the abnormal port 21B is resumed, and the processing circuit 15 of the network switch 5 determines whether the abnormal port 25A is resumed. After restoring operations such as electricity restoration, rebooting, or repairing, in response to that the processing circuit 11 of the network switch 1 detects that the port 21B is resumed, the step S44 is executed, where the processing circuit 11 of the network switch 1 transmits a block control frame BF through the port 21A. Similarly, in response to that the processing circuit 15 of the network switch 5 detects that the port 25A is resumed, the processing circuit 15 of the network switch 5 transmits another block control frame BF through the port 25B.

Figure 14:
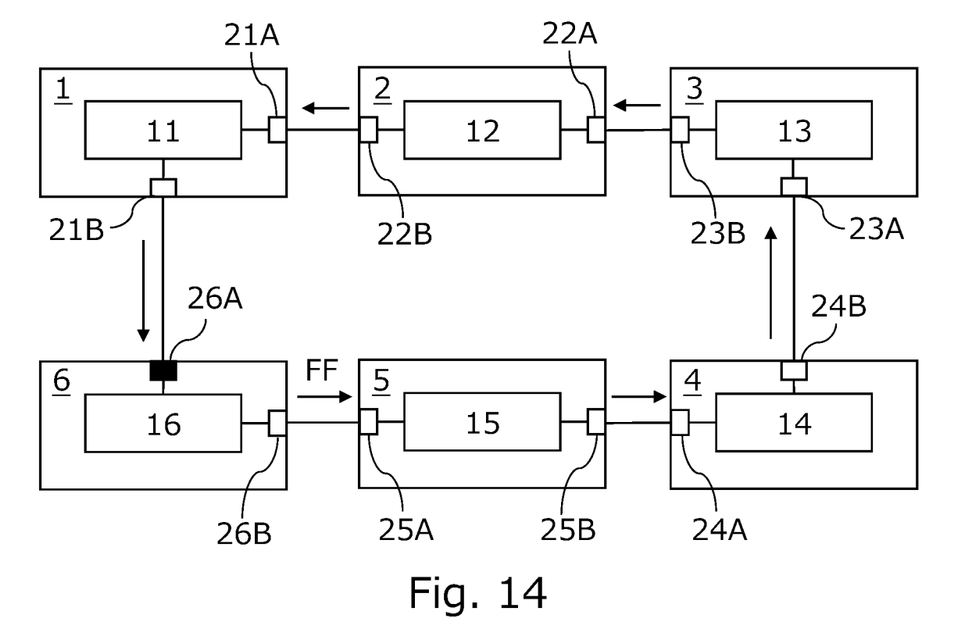
FIG. 14 illustrates a second schematic diagram of topology resuming of an abnormal single loop network according to the third exemplary embodiment of the instant disclosure.

FIG. 14 illustrates a second schematic diagram of topology resuming of an abnormal single loop network according to the third exemplary embodiment of the instant disclosure. Please refer to FIG. 3 and FIG. 14 together. The network switch 6 executes the initialization procedure shown in FIG. 3 after restoring. Similar to the aforementioned step S35, after the network switch 6 is powered up, the processing circuit 16 of the network switch 6 transmits a forward control frame FF through the port 26B. In this exemplary embodiment, the forward control frame FF is not transmitted in response to that the processing circuit 16 of the network switch 6 receives the block control frame BF.

Please refer to FIG. 4 and FIG. 14 together. In the step S45, the processing circuit 11 of the network switch 1 determines whether the forward control frame FF is received. In response to that the forward control frame FF is received, the step S46 is executed, where the processing circuit 15 of the network switch 5 sets the port 25A in the disabled state to the enabled state. Similarly, in response to that the processing circuit 11 of the network switch 1 receives the forward control frame FF, the processing circuit 11 of the network switch 1 sets the port 21B in the disabled state to the enabled state. As a result, the network topology of the single loop network is resumed to the state before abnormity occurred.

Figure 15:
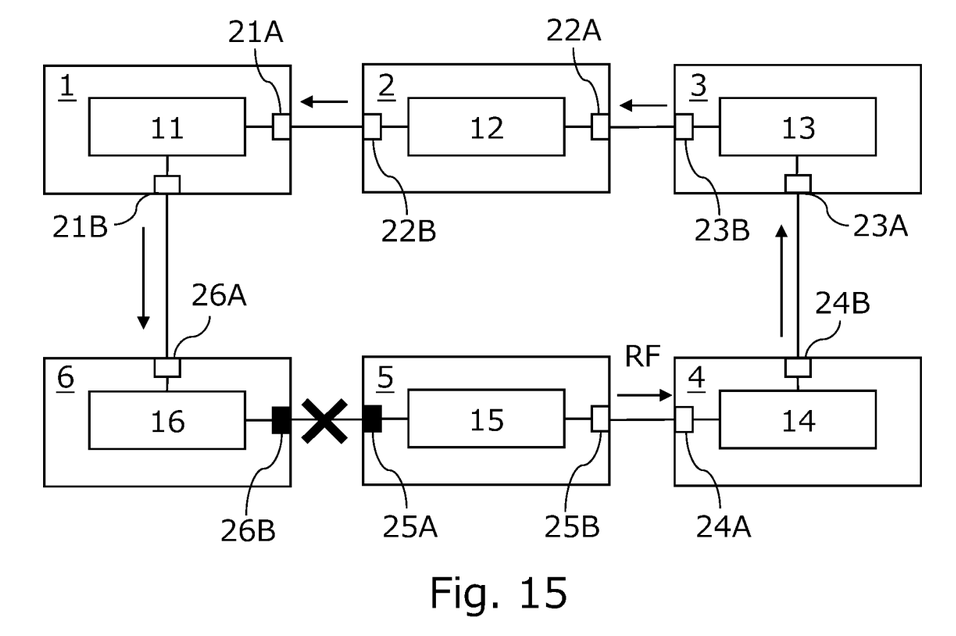
FIG. 15 illustrates a schematic diagram of topology rebuild of an abnormal single loop network according to a fourth exemplary embodiment of the instant disclosure.

FIG. 15 illustrates a schematic diagram of topology rebuild of an abnormal single loop network according to a fourth exemplary embodiment of the instant disclosure. FIG. 15 shows a situation where the transmission between one of the first network switches and the second network switch is abnormal. In this embodiment, the abnormal transmission is between the port 25A of the network switch 5 and the port 26B of the network switch 6. For example, the transmission abnormity may be that the port 25A or the port 26B is damaged, that the transmission cable between the port 25A and the port 26B is damaged, or that the transmission cable is disconnected from the port 25A or the port 26B.

Please refer to FIG. 5 and FIG. 15 together. In the step S51, the processing circuit 16 of the network switch 6 determines whether the port 26A or the port 26B is detected to be abnormal. If the determination comes out positive, the step S52 is executed, where whether the abnormal port 102 is in the disabled state is determined. If the determination of the step S52 comes out negative, the port 26B in the enabled state is abnormal. In response to that the port 26B is detected to be abnormal, the step S53 is executed, where the processing circuit 16 of the network switch 6 sets the abnormal port 26B to the disabled state and set the port 26A in the disabled state to the enabled state. As a result, the single loop network is rebuilt and can resume normal operation. On the other hand, similar to the third exemplary embodiment, through the step S41 and the step S42, the processing circuit 15 of the network switch 5 detects that the port 25A is abnormal and thus sets the abnormal port 25A to the disabled state and transmits a recovery control frame RF through the other port 25B.

In general, the time when the processing circuit 16 of the network switch 6 detects that the port 26B is abnormal is earlier than the time when the processing circuit 16 of the network switch 6 receives the recovery control frame RF. In other words, in this exemplary embodiment, the processing circuit 16 of the network switch 6 can directly switch the state of the port 26A upon detecting that the port 26B is abnormal and does not have to wait until receiving the recovery control frame RF to switch the port 26A to the enabled state.

If the determination of the step S52 comes out positive, the port 26A in the disabled state is abnormal. In this situation, because the port 26A is in the disabled state and does not transmit any frame, the processing circuit 16 of the network switch 6 may choose not to perform any procedure. In some exemplary embodiments, if the determination of the step S52 comes out positive, the processing circuit 16 of the network switch 6 still transmits a recovery control frame RF through the port 26B; because the port 26A is abnormal, the processing circuit 16 of the network switch 6 will not receive the recovery control frame RF forwarded by the other network switches 10, and thus the processing circuit 16 of the network switch 6 still does not perform any procedure.

Figure 16:
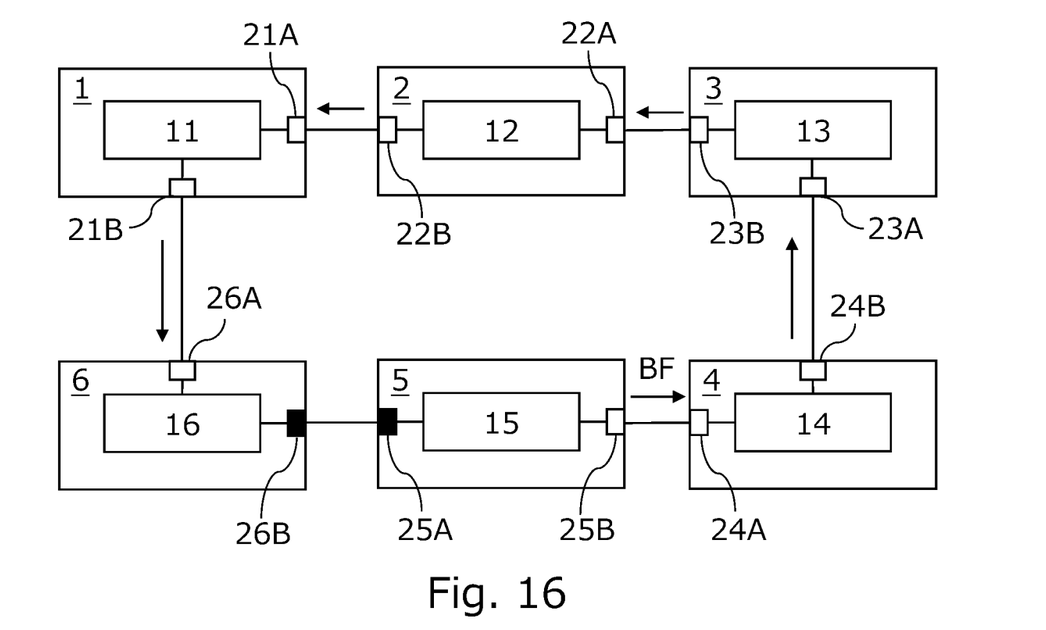
FIG. 16 illustrates a first schematic diagram of topology resuming of an abnormal single loop network according to the fourth exemplary embodiment of the instant disclosure.

FIG. 16 illustrates a first schematic diagram of topology resuming of an abnormal single loop network according to the fourth exemplary embodiment of the instant disclosure. Please refer to FIG. 4 and FIG. 16 together. In the step S43, the processing circuit 15 of the network switch 5 determines whether the abnormal port 25A is resumed. After restoring operations such as repairing, in response to that the processing circuit 15 of the network switch 5 detects that the port 25A is resumed, the step S44 is executed, where the processing circuit 15 of the network switch 5 transmits a block control frame BF through the port 25B.

Figure 17:
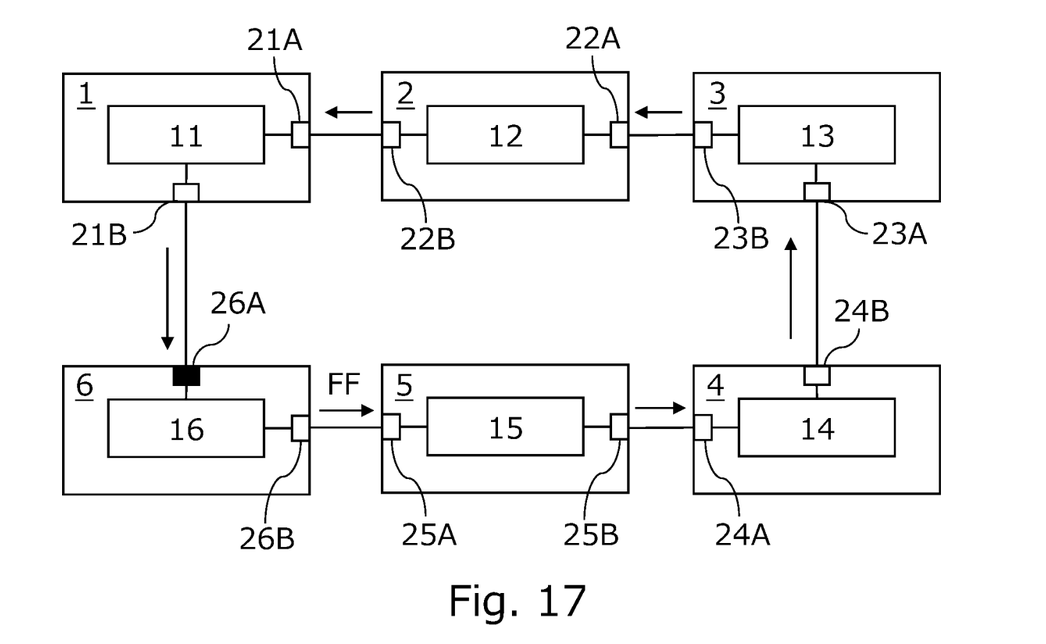
FIG. 17 illustrates a second schematic diagram of topology resuming of an abnormal single loop network according to the fourth exemplary embodiment of the instant disclosure.

FIG. 17 illustrates a second schematic diagram of topology resuming of an abnormal single loop network according to the fourth exemplary embodiment of the instant disclosure. Please refer to FIG. 5 and FIG. 17 together. Similar to the first, second, and third exemplary embodiments illustrated above, through the step S56 and the step S57, in response to that the processing circuit 16 of the network switch 6 receives the block control frames BF, the processing circuit 16 of the network switch 6 sets the port 26A in the enabled state to the disabled state and sets the port 26B in the disabled state to the enabled state so as to transmit a forward control frame FF through the port 26B.

Please refer to FIG. 4 and FIG. 17 together. In the step S45, the processing circuit 15 of the network switch 5 determines whether the forward control frame FF is received. In response to that the forward control frame FF is received, the step S46 is executed, where the processing circuit 15 of the network switch 5 sets the port 25A in the disabled state to the enabled state. As a result, the network topology of the single loop network is resumed to the state before abnormity occurred.

It should be illustrated that, in the fourth exemplary embodiment, the network switch 6 does not actively detect whether the abnormal port 26B is resumed. Instead, in this exemplary embodiment, the network switch 6 learns that the abnormal port 26B is resumed through the block control frame BF transmitted by the first network switch (the network switch 5) coupled to the network switch 6 upon detecting the resumption; thus, the network switch 6 executes the step S57.

It is worth mentioning that it can be seen from the above illustration that the second network switch does not forward control frames.

The aforementioned at least one first network switch and second network switch are not root bridges. In other words, in this embodiment, during the processing of forming (such as initially building, rebuilding, and resuming) the single loop network, the network switches 1-6 do not execute an election process with one another. Each of the network switches 1-6 has a media access control (MAC) address. Upon forming the single loop network, the network switches 1-6 do not transmit the MAC addresses and IDs of the network switches 1-6 to one another to elect the root bridge, and the network switches 1-6 do not need to elect the ports 21A-26A, 21B-26B as root ports, designated ports, or alternate ports, and thus the speed of the building process of the single loop network can be substantially increased.

Besides, the aforementioned control frames do not include the MAC addresses and IDs of the transmission end (i.e., in this embodiment, the network switch 10 which transmits the control frames). The control frames are continuously forwarded from one network switch 10 to the next network switch in the single loop network until the control frames are forwarded to a network switch 10 with a port 102 in the disabled state, and then the forwarding of the control frames is ended. In other words, in this embodiment, during the process of initially building, rebuilding, or resuming the single loop network, the control frames are not transmitted to a root bridge, so that no root bridge notifies other network switches 10, and thus the speed of the initial building, rebuilding, and resumption of the single loop network can be substantially increased.

In some exemplary embodiments, the network switches 1-6 do not regularly exchange spanning tree protocol (STP)-defined bridge protocol data units (BPDU), and thus the amount of data exchange among the network switches 1-6 can be reduced. Furthermore, when the network switches 1-6 set the states of the ports 21A-26A, 21B-26B, the states of the ports 21A-26A, 21B-26B are directly switched from the disabled state to the enabled state or from the enabled state to the disabled state. In other words, during the process of switching the states of the ports 21A-26A, 21B-26B from the disabled state to the enabled state or from the enabled state to the disabled state, the port states are directly switched to the disabled state or the enabled state and not through any other port state (such as a listening state, a learning state, and a discarding state). As a result, the ports 21A-26A, 21B-26B do not need to wait for the BPDU to switch the port states, and thus the speed of the rebuilding and the resumption of the single loop network can be increased.

In some exemplary embodiments, the aforementioned enabled state may refer to a STP-defined forwarding state, the aforementioned disabled state may refer to a STP-defined blocking state, and the control frames may be STP-defined BPDUs. As a result, the network switches 1-6 are also suitable for STP and rapid STP (rapid spanning tree protocol, RSTP).

In some exemplary embodiments, the processing circuit 101 is implemented using a central processing unit (CPU), a microprocessor, an application-specific integrated circuit (ASIC), a system on a chip (SOC), or the like.

According to an exemplary embodiment of the method for resuming a single loop network and the network switch of the instant disclosure, when a port 102 is detected to be abnormal, the network topology can be automatically rebuilt, so as to maintain the operation of the single loop network; when the resumption of the abnormal port 102 is detected, the original network topology can be automatically resumed. Furthermore, according to one or some embodiments of the instant disclosure, during the process of building, rebuilding, or resuming the single loop network, the election process of root bridge among the network switches 10 is omitted, and thus the network switches 10 do not need to elect roles for the ports 102 through the MAC addresses and IDs of the network switches 10. As a result, when the network topology needs to be changed or resumed, the network switches 10 do not need to notify other network switches 10 through the root bridge, and thus the single loop network can be built quickly. Compared to the STP technology and RSTP technology, the network switch system according to one or some embodiments of the instant disclosure can complete the building and resumption of the single loop network within 1 ms, and thus the amount of data loss of the user of the network switch 10 can be minimized.

What is claimed is:

1. A method for resuming a topology of a single loop network, wherein the single loop network comprises at least one first network switch and a second network switch, each of the at least one first network switch comprises a first port and a second port, and the second network switch comprises a third port and a fourth port; each of the first port, the second port, the third port, and the fourth port is in an enabled state or a disabled state by default so as to form a single loop network, and the method comprises:
   in response to one of the at least one first network switch detecting that the first port is abnormal, setting the first port to the disabled state by the first network switch and transmitting a recovery control frame through the second port by the first network switch;

in response to the second network switch receiving the recovery control frame, setting the third port in the disabled state to the enabled state by the second network switch;

in response to one of the at least one first network switch detecting that the first port is resumed, transmitting a block control frame through the second port by the first network switch;

in response to the second network switch receiving the block control frame, setting the third port in the enabled state to the disabled state by the second network switch and transmitting a forward control frame through the fourth port by the second network switch; and in response to one of the at least one first network switch receiving the forward control frame, setting the first port in the disabled state to the enabled state by the first network switch;

wherein the recovery control frame, the block control frame, and the forward control frame do not contain the MAC address of a transmission end and an ID of the transmission end.

2. The method according to claim 1, wherein the second network switch is configured to transmit the forward control frame after the second network switch is powered on.

3. The method according to claim 1, further comprising: in response to that the second network switch detects that the fourth port is abnormal, setting the fourth port to the disabled state by the second network switch and setting the third port in the disabled state to the enabled state by the second network switch.

4. The method according to claim 1, wherein when one of the at least one first network switch with both the first port and the second port in the enabled state receives a frame being one of the restore control frame, the block control frame, or the forward control frame through one of the first port and the second port, one of the at least one first network switch is configured to forward the frame received through the other one of the first port and the second port.

5. The method according to claim 1, wherein each of the first port, the second port, the third port, and the fourth port is configured to be directly switched between the enabled state and the disabled state without any other port state.

6. The method according to claim 1, wherein the at least one first network switch and the second network switch are not root bridges.

7. The method according to claim 1, wherein the at least one first network switch and the second network switch do not transmit spanning tree protocol (STP)-defined bridge protocol data unit (BPDU) in the single loop network.

8. The method according to claim 1, wherein each of the at least one first network switch and the second network switch has a media access control (MAC) address, and each of the at least one first network switch and the second network switch does not transmit the MAC address to other network switches when the single loop network is formed.

9. A network switch system adapted to form a single loop network, wherein the network switch system comprises:
at least one first network switch comprising:
a first port;
a second port, wherein each of the first port and the second port is in an enabled state by default; and
a first processing circuit coupled to the first port and the second port, wherein the first processing circuit is configured to: set the first port to a disabled state and transmit a recovery control frame through the second port in response to detecting that the first port is abnormal; transmit a block control frame through the second port in response to detecting that the first port is resumed; and set the first port in the disabled state to the enabled state in response to receiving a forward control frame; and a second network switch coupled to the at least one first network switch, wherein the second network switch comprises:
a third port in the disabled state by default;
a fourth port in the enabled state by default; and
a second processing circuit coupled to the third port and the fourth port, wherein the second processing circuit is configured to: set the third port in the disabled state to the enabled state in response to receiving the recovery control frame; and set the third port in the enabled state to the disabled state and transmit the forward control frame through the fourth port in response to receiving the block control frame;

wherein the recovery control frame, the block control frame, and the forward control frame do not contain the MAC address of a transmission end and an ID of the transmission end.

10. The network switch system according to claim 9, wherein the second processing circuit is configured to transmit the forward control frame through the fourth port after the second network switch is powered on.

11. The network switch system according to claim 9, wherein the second processing circuit of the second network switch is configured to set the fourth port to the disabled state and set the third port in the disabled state to the enabled state in response to detecting that the fourth port is abnormal.

12. The network switch system according to claim 9, wherein when one of the at least one first network switch with both the first port and the second port in the enabled state receives a frame being one of the restore control frame, the block control frame, or the forward control frame through one of the first port and the second port, the first network switch is configured to forward the frame received through the other one of the first port and the second port.

13. The network switch system according to claim 9, wherein each of the first port, the second port, the third port, and the fourth port is configured to be directly switched between the enabled state and the disabled state without any other port state.

14. The network switch system according to claim 9, wherein the at least one first network switch and the second network switch are not root bridges.

15. The network switch system according to claim 9, wherein the at least one first network switch and the second network switch do not transmit spanning tree protocol (STP)-defined bridge protocol data unit (BPDU) in the single loop network.

16. The network switch system according to claim 9, wherein each of the at least one first network switch and the second network switch has a media access control (MAC) address, and each of the at least one first network switch and the second network switch does not transmit the MAC address to other network switches when the single loop network is formed.

* * * * *